2 Sheets—Sheet 1.

A. H. HILL.

WINDOW BLIND.

No. 10,692. Reissued Feb. 23, 1886.

Witnesses
Chas. H. Davis
A. E. Powell

Inventor
A. H. Hill

By Attorney J. Y. Alexander

N. PETERS, Photo-Lithographer, Washington, D. C.

A. H. HILL.

WINDOW BLIND.

No. 10,692. Reissued Feb. 23, 1886.

Witnesses
Chas. H. Lawin
A. E. Dowell

Inventor
A. H. Hill

By Attorney T. H. Alexander

N. PETERS, Photo-Lithographer, Washington, D. C.

UNITED STATES PATENT OFFICE.

ALEXANDER H. HILL, OF OSKALOOSA, IOWA.

WINDOW-BLIND.

SPECIFICATION forming part of Reissued Letters Patent No. 10,692, dated February 23, 1886.

Original No. 294,233, dated February 26, 1884. Application for reissue filed December 22, 1885. Serial No. 186,491.

*To all whom it may concern:*

Be it known that I, ALEXANDER H. HILL, of Oskaloosa, in the county of Mahaska and State of Iowa, have invented certain new and useful Improvements in Sliding Window-Blinds; and I do hereby declare that the following is a full, clear, and exact description thereof, reference being had to the accompanying drawings, and to the letters of reference marked thereon, which form part of this specification, in which—

Figure 1:
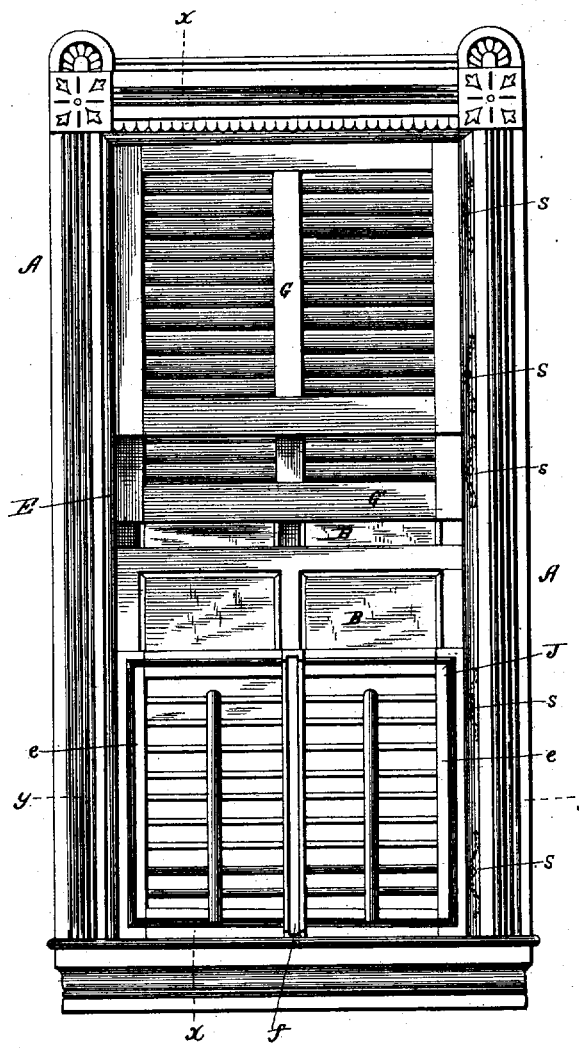
Figure 2:
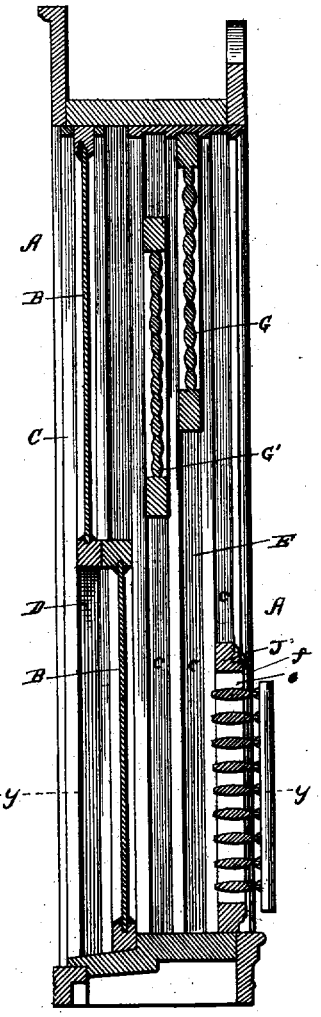
Figure 3:
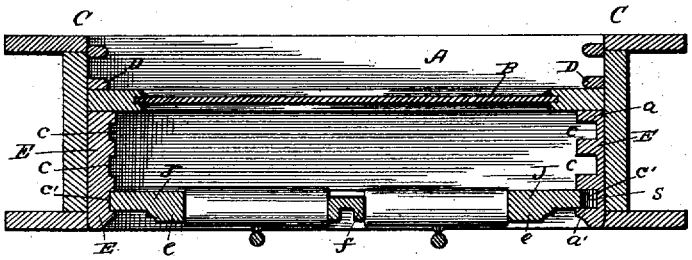
Figure 4:
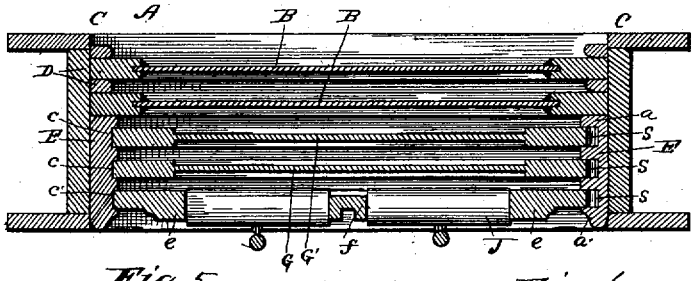
Figure 5:
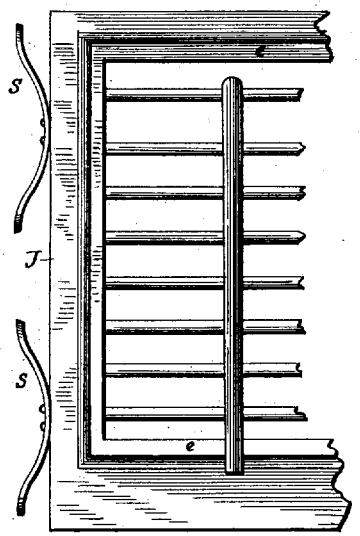
Figure 6:
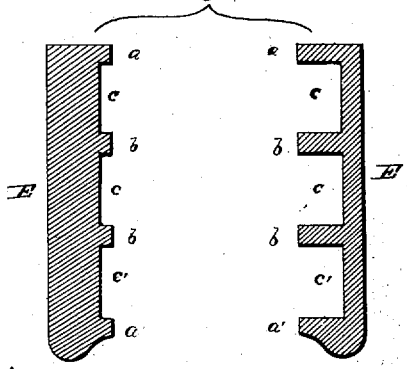
Figure 7:
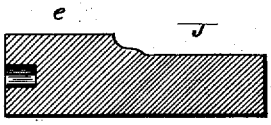

Figure 1 is an inside view of a window-frame having my improved sliding window-blinds applied to it, showing the close-fitting slatted blinds raised and the movable slatted blind depressed. Fig. 2 is a vertical section through Fig. 1 in the plane indicated by dotted line *x x* thereon. Fig. 3 is a section taken horizontally through Fig. 1 in the plane indicated by dotted lines *y y* on Figs. 1 and 2. Fig. 4 is also a horizontal section with the sashes and blinds lowered. Fig. 5 is a sectional detail of the slatted blind, showing the semi-elliptic springs attached thereto. Fig. 6 is an enlarged sectional view of the grooved strips in which the blinds slide; and Fig. 7 is an enlarged view, in section, of the stiles, showing their beaded or re-enforced portion.

This invention relates to improvements on movable sliding window-blinds; and it consists in grooved strips adapted to the window-frame to receive and guide the window-blinds, said strips and blinds being arranged inside of the window-sashes and taking the place of the inside stop for the sash, all of which will be fully understood from the following description, when taken in connection with the annexed drawings.

A designates a window-frame, which may be constructed in the usual well-known manner, and B B are two window sashes, which are guided by the outside stops, C. The meeting strips D and broad-grooved strips E E are rigidly secured to the jambs of the window-frame. Each one of these strips is made of a single piece, having three grooves, *c c c′*, in its inside face, which leaves the inside stops, *a*, and outside stops, *a′*, and two intermediate stops, *b b*. The grooves *c c* in the strips E E receive the edges of the stiles of vertically-sliding blinds G G′, which are constructed with closely-fitting slats, and the grooves *c′* receive the edges of the stiles of a blind, J, which is provided with movable pivoted slats connected in sections by rods, in the well-known manner of constructing pivoted slatted blinds.

It is obvious from the above description that the blinds can be adjusted so as to partially exclude the light or to admit light from the top, the middle, or the bottom; also, that by means of the pivoted slatted blind free ventilation is allowed at any desired point between the top and bottom of the window-frame.

The frame of my pivoted slatted blind-section J consists of top and bottom rails united to stiles having re-enforced portions *e e* formed on the stiles or made separate and nailed to them. The outside tenons of the slats have their bearings in said portions *e e*, and the inside tenons of the slats have their bearings in a central strip, *f*, nailed to the rails of the blind-frame.

By having the grooves *c c* in one of the strips E deeper than those in the other strip, as shown fully in Fig. 6, the sliding blinds may be easily removed or adjusted in place, and may also be neatly applied to almost any window-frame at a very small cost, without in any manner interfering with the working of the window-sash, and said blinds can be operated to admit into a room more or less light, as may be desired.

For the purpose of readily introducing these blinds into their respective grooves in the side strips, E E, or removing the blinds therefrom, I make the blinds of less width than the distances between the bases of their grooves in the said strips E E, and employ bearing-springs S, as shown in Fig. 1 in dotted lines, and in full lines in Fig. 5. These springs S are of the semi-elliptic kind, and they are secured to one side of each blind.

I prefer two springs for each blind, thus affording four distinct bearings against the base of the groove in strip E, which will better hold the frame at any desired point of adjustment.

I am aware that spiral springs attached to wooden blocks have been employed for a like purpose in connection with blinds, and hence do not claim in a broad sense this feature; but, Having described my invention, I claim—

1. The combination of a window-frame, the outer and parting stops, the sashes, the grooved strips secured to the inner sides of the frame and forming the stops or beads for the inner sash, and a series of blinds mounted to slide in said strips, one of said blinds being equipped with pivoted slats, as set forth.

2. The blind J, having the stiles provided with the beads *e* and center strip, *f*, in combination with the slats pivoted in said beads and center strip, as set forth.

In testimony that I claim the foregoing as my own I affix my signature in presence of two witnesses.

ALEXANDER H. HILL.

In presence of—
T. H. ALEXANDER,
W. H. C. MONROE.